US008584412B2

(12) United States Patent
Frecska et al.

(10) Patent No.: US 8,584,412 B2

(45) Date of Patent: *Nov. 19, 2013

(54) ELECTRICALLY POWERABLE GRID ELEMENT

(75) Inventors: Sandor A. Frecska, Lancaster, PA (US); Brian T. Patterson, Lewisberry, PA (US); William E. Beakes, Columbia, PA (US); Jere W. Myers, Washington Boro, PA (US); Joseph R. Woelfling, Palmyra, PA (US)

(73) Assignee: Worthington Armstrong Venture, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/701,013

(22) Filed: Feb. 5, 2010

(65) Prior Publication Data

US 2010/0132281 A1 Jun. 3, 2010

Related U.S. Application Data

(62) Division of application No. 11/127,853, filed on May 12, 2005, now Pat. No. 7,661,229.

(51) Int. Cl.
*H02G 3/38* (2006.01)

(52) U.S. Cl.
USPC ............ 52/220.6; 52/29; 52/506.06; 174/491

(58) Field of Classification Search
USPC .................. 52/28, 29, 220.7, 506.06, 506.07, 52/220.6, 506.08, 506.09; 439/110, 111, 439/112, 114, 117, 119, 209, 210, 211, 212
See application file for complete search history.

(56) References Cited

U.S. PATENT DOCUMENTS

| | | | | |
|---|---|---|---|---|
| 2,905,806 A | | 9/1959 | Tunney | 240/3 |
| 3,001,001 A | * | 9/1961 | Bibb | 174/71 R |
| 3,123,310 A | * | 3/1964 | Dameral | 362/221 |
| 3,124,403 A | * | 3/1964 | Rowe | 439/212 |
| 3,158,327 A | * | 11/1964 | Dameral | 362/260 |
| 3,504,172 A | | 3/1970 | Liberman | 240/78 |
| 3,590,135 A | | 6/1971 | Herbenar et al. | 174/49 |
| 3,683,100 A | | 8/1972 | Deal et al. | 174/48 |
| 3,710,530 A | * | 1/1973 | Valtonen | 52/666 |
| 3,725,568 A | | 4/1973 | Stanley | 174/48 |
| 3,781,567 A | | 12/1973 | Papsco | 307/147 |
| 3,898,782 A | * | 8/1975 | Donato | 52/506.08 |
| 4,109,305 A | | 8/1978 | Claussen et al. | 362/418 |
| 4,377,724 A | * | 3/1983 | Wilson | 174/497 |
| 4,414,617 A | | 11/1983 | Galindo | 362/404 |
| 4,540,847 A | * | 9/1985 | Gardner | 174/491 |
| 4,631,648 A | | 12/1986 | Nilssen | 362/150 |
| 4,822,292 A | | 4/1989 | Thayer et al. | 439/207 |
| 5,154,509 A | | 10/1992 | Wulfman et al. | 362/226 |
| 5,203,713 A | * | 4/1993 | French et al. | 439/215 |
| 5,205,091 A | * | 4/1993 | Brown | 52/126.6 |
| 5,316,490 A | * | 5/1994 | Clemence et al. | 439/114 |
| 5,455,754 A | | 10/1995 | Hoffner | 362/250 |
| 5,890,918 A | * | 4/1999 | Hierzer | 439/110 |
| 5,941,627 A | | 8/1999 | Sacher | 362/249 |

(Continued)

*Primary Examiner* — William Gilbert
*Assistant Examiner* — Alp Akbasli

(57) ABSTRACT

An electrically powerable grid element having first and second conductive members of opposing polarity. The grid element includes first and second electrical access slots which expose the conductive members. The grid element includes a tap which has a conductor engaging means which forms an electrical connection with the first and second conductors via the first and second electrical access slots.

20 Claims, 6 Drawing Sheets

(56) References Cited

U.S. PATENT DOCUMENTS

| | | | | |
|---|---|---|---|---|
| 6,059,582 | A * | 5/2000 | Tsai | 439/121 |
| 6,113,248 | A * | 9/2000 | Mistopoulos et al. | 362/240 |
| 6,190,198 | B1 | 2/2001 | Ray | 439/532 |
| 6,722,918 | B2 | 4/2004 | McCoy | 439/533 |
| 6,769,785 | B1 * | 8/2004 | Herst et al. | 362/147 |
| 6,827,592 | B2 | 12/2004 | McCoy et al. | 439/118 |
| 7,214,079 | B2 * | 5/2007 | Kim et al. | 439/211 |
| 7,338,182 | B1 * | 3/2008 | Hastings et al. | 362/150 |
| 7,351,075 | B1 * | 4/2008 | Patterson et al. | 439/121 |
| 7,455,535 | B2 * | 11/2008 | Insalaco et al. | 439/121 |
| 7,503,778 | B2 * | 3/2009 | Lehman et al. | 439/110 |
| 7,547,221 | B2 * | 6/2009 | Kim et al. | 439/211 |
| 7,654,834 | B1 * | 2/2010 | Mier-Langner et al. | 439/115 |
| 7,836,662 | B2 * | 11/2010 | Ludi | 52/745.2 |
| 2002/0109984 | A1 | 8/2002 | Bischel et al. | 362/150 |
| 2003/0159850 | A1 * | 8/2003 | McCarthy | 174/211 |
| 2003/0207612 | A1 | 11/2003 | McCoy | 439/533 |
| 2005/0215093 | A1 * | 9/2005 | Jong | 439/110 |

* cited by examiner

ELECTRICALLY POWERABLE GRID ELEMENT

CROSS REFERENCE TO RELATED APPLICATIONS

This is a divisional application of a previously filed U.S. application Ser. No. 11/127,853 filed May 12, 2005, now U.S. Pat. No. 7,661,229 entitled "Electrical Conductivity in a Suspended Ceiling System."

BACKGROUND OF THE INVENTION

The invention relates to grid element, and, in particular, to a grid element which carries electrifiable conductive material. By using electrical taps in combination with the conductive material, the grid element is able to distribute electricity, and preferably low voltage electricity.

A conventional grid framework, such as one used in a ceiling, includes main grid elements with cross grid elements extending therebetween. The main and cross grid elements form the framework into a grid of polygonal shaped openings into which functional devices such as ceiling tiles, light fixtures, speakers and the like can be inserted and supported. There is an increasing desire to have electrical functionality available for such devices. Conventional techniques include mounting cable trays and electrical junctions. However, these systems result in a complex network of wires, and, once installed, these wires are difficult to service and reconfigure.

SUMMARY OF THE INVENTION

The present invention provides an electrically powerable grid element for use in the interior building environment. The grid element includes first and second conductive members having opposing polarity which are carried in the grid element. The grid element also includes a first electrical access slot which exposes a portion of the first conductive member and a second electrical access slot which exposes a portion of the second conductive member. The first and second electrical access slots are offset from one another in at least two planes. The grid element further includes a tap which forms an electrical connection with the first and second conductive members via the first and second electrical access slots.

DETAILED DESCRIPTION OF THE DRAWINGS

Figure 1:
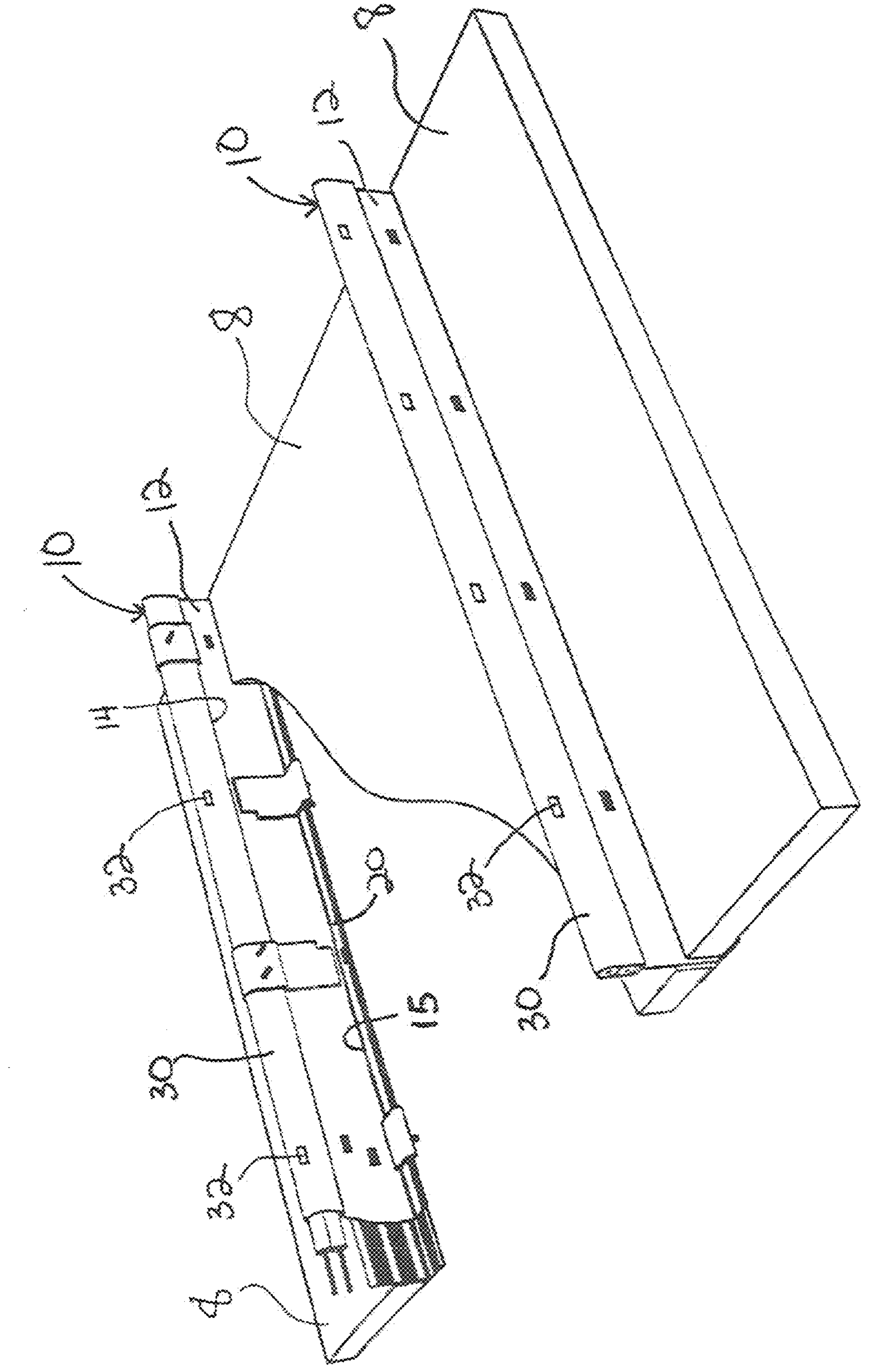
FIG. 1 is a fragmentary perspective view of a ceiling system showing electrically powerable grid elements in accordance with an exemplary embodiment of the invention.

Reference is now made to the drawings wherein similar components bear the same reference numerals throughout the several views. For illustrative purposes, FIG. 1 illustrates a portion of a ceiling system. A conventional ceiling system includes a plurality of grid elements which form a grid framework. Each grid element can be formed from a single piece of sheet metal, such as steel or aluminum, by conventional means such as folding and stamping.

In the example embodiment illustrated in FIGS. 1-4, each grid element 10 includes a vertical web portion 12 which is integral with a hollow bulb portion 30 at top edge 14 and with a flange portion 20 at bottom edge 15. The flange portion 20 is formed on and centered along the bottom edge 15. The flange portion 20 has a top surface 21 and a bottom surface 23.

Figure 2:
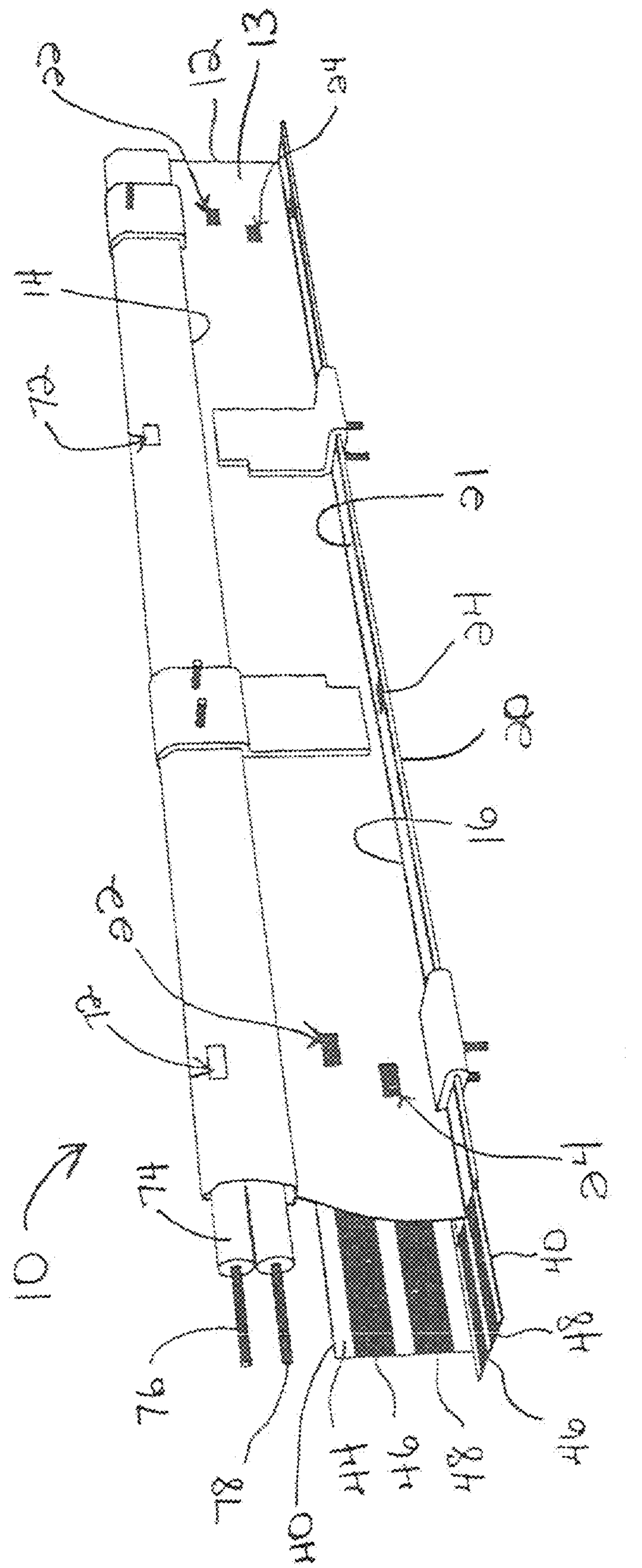
FIG. 2 is a perspective view of an electrically powerable grid element in accordance with an exemplary embodiment of the invention.
Figure 3:
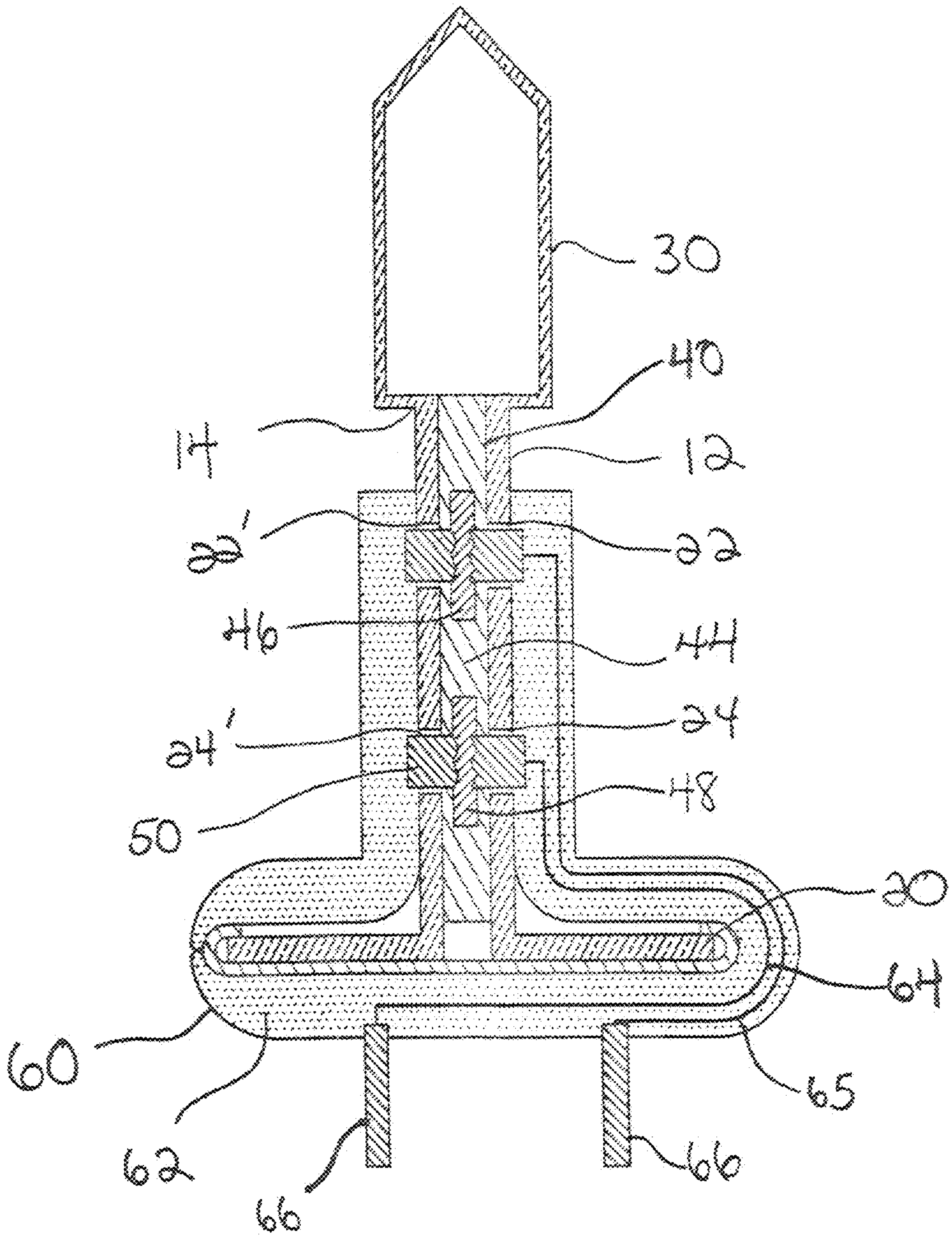
FIG. 3 is a cross-sectional view of an electrically powerable grid element in accordance with an exemplary embodiment of the invention.

In the example embodiment shown in FIGS. 2 and 3, formed in each side of the vertical web portion 12 are upper and lower conductor access slots 22, 22', 24, 24'. Upper conductor access slot 22, which is formed in a first side 13 of the vertical web portion 12, may be longitudinally aligned with, or longitudinally offset from, lower conductor access slot 24. FIG. 2 illustrates slots 22 and 24 as longitudinally offset. Similarly, upper conductor access slot 22' may be aligned with, or longitudinally offset from, lower conductor access slot 24'. In either case, as shown in FIG. 3, the upper conductor access slots, 22 and 22', are transversely aligned with one another on opposing sides of the vertical web portion 12. Likewise, the lower conductor access slots, 24 and 24', are transversely aligned with one another.

A conventional conductive strip 40 is embedded within the vertical web portion 12. The conductive strip 40 includes an insulator 44 which encapsulates first and second conductors, 46 and 48 respectively, which can be formed from materials such as, but not limited to, copper, conductive plastic and conductive fiber. For polarity, one conductor is positive and the other is negative. The conductors 46, 48 are vertically spaced and extend in parallel relation to one another, such that the upper slots 22 and 22' are transversely aligned with conductor 46 and lower slots 24 and 24' are transversely aligned with conductor 48.

Turning to FIG. 3, a tap 60 is attached to the web 12 and flange portion 20 of the grid element 10. The tap includes a housing 62 which covers the vertical web portion 12 and flange portion 20 of the grid element 10. Housing 62 is preferably shaped to closely conform to the grid element 10 to provide ease in crimping, as described below. The conforming shape of the housing 62 provides clearance for a ceiling panel 8, which is manufactured for use in the ceiling system, to be installed without having to modify the size of the panel.

The tap 60 further includes a conductor engaging means 50. In the configuration illustrated in FIG. 3, the conductor engaging means is a crimp connector. Each crimp connector 50 is at least partially embedded in the housing 62 and is positioned in the housing 62 such that when the housing is attached to the grid element, each crimp connector is in transverse alignment with a conductor access slot 22, 22', 24, 24' and, in turn, in transverse alignment with a respective flat wire conductor 46, 48. Each conductor access slot 22, 22', 24, 24' allows for insertion of a crimp connector 50 into the vertical web portion 12. Thus, when the tap housing 62 is crimped using a conventional crimping tool, the crimp connector 50 is able to pierce the insulation 44 of the conductive strip 40 and make electrical contact with either conductor 46 or 48. Insulator 44 is formed from materials soft enough to be pieced easily by a crimp connector 50. Example materials for insulator 44 include plastic, rubber and organic foam.

The tap 60 also includes tap conductors 64 and 65 which are preferably embedded in the tap housing 62. Similar to conductors 46 and 48 of conductive strip 40, for polarity, one tap conductor is positive and the other is negative. Each tap conductor 64, 65 is attached to a crimp connector 50 at one end and to a connecting stud 66 at the opposite end. Each connecting stud 66 is partially embedded in the housing 62, extends outwardly from the outer surface of the housing 62 and serves as a connector for electrically powered devices. Exemplary electrically powered devices include light fixtures, low voltage light fixtures, speakers, cameras, motors, motion sensors and smoke detectors.

Figure 5:
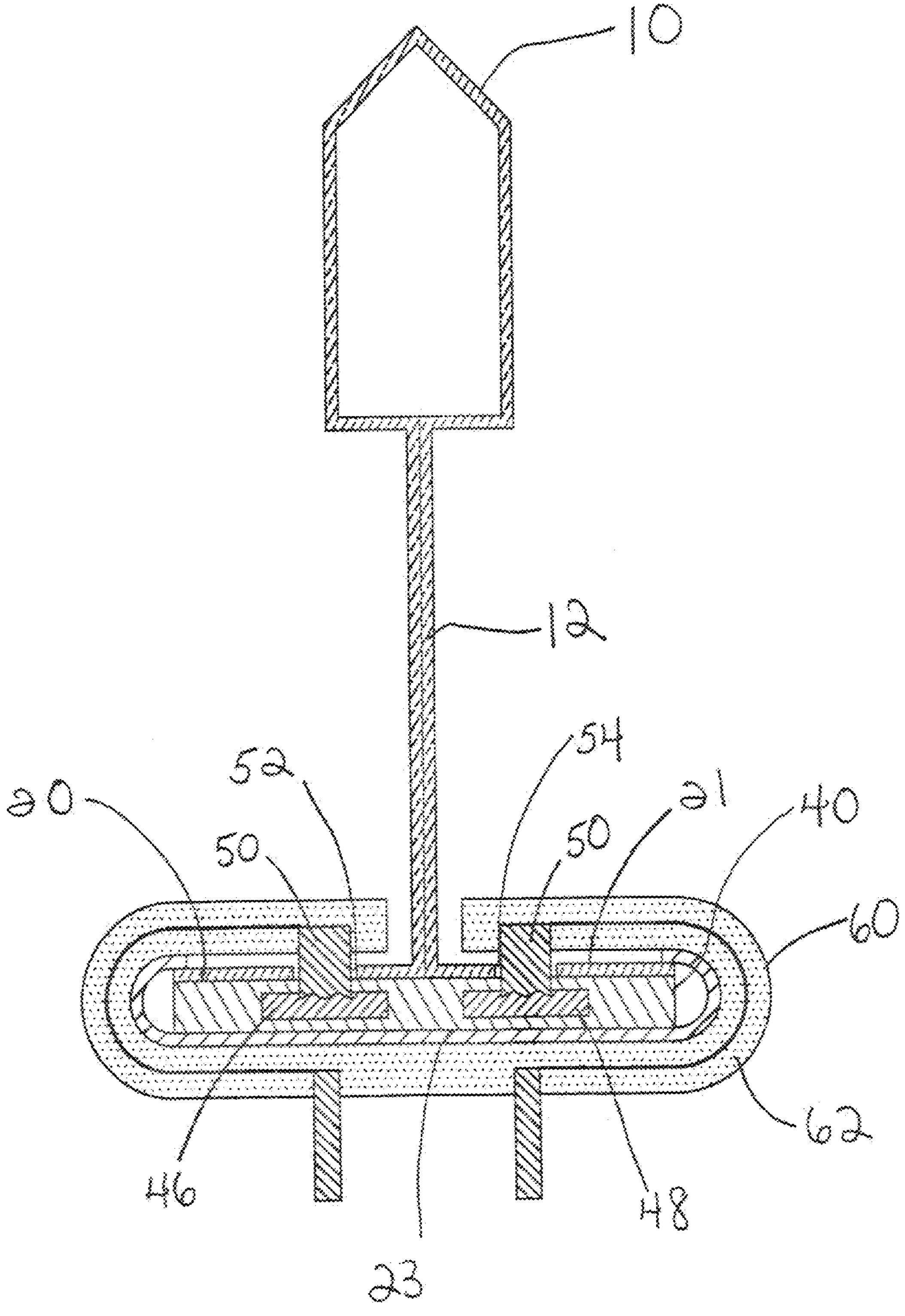
FIG. 5 is a cross-sectional view of an electrically powerable grid element in accordance with yet another exemplary embodiment of the invention.
Figure 6A:
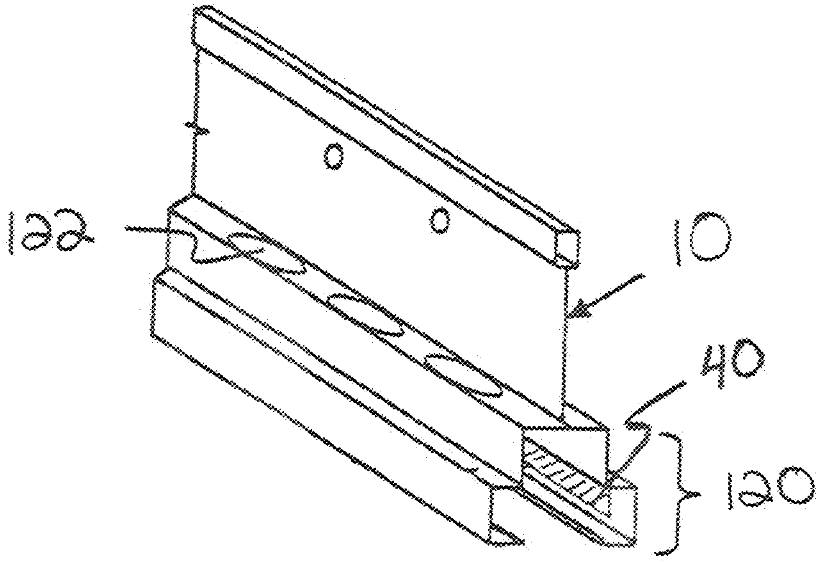
FIG. 6*a* is a fragmentary perspective view of an example electrically powerable grid element having a track.
Figure 6B:
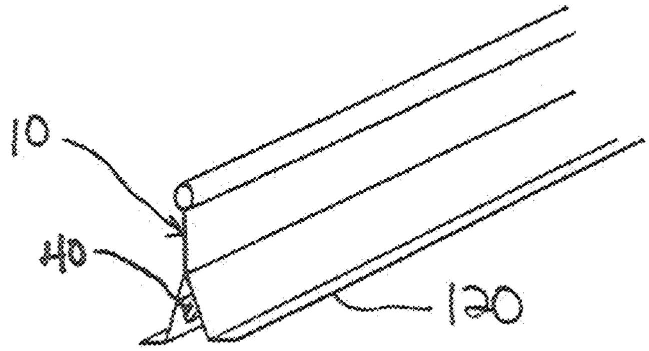
FIG. 6*b* is a fragmentary perspective view of an alternative example of an electrically powerable grid element having a track.

FIGS. 2 and 5 illustrate an alternative example configuration in which the conductive strip 40 is embedded in the lower flange portion 20 of the grid element 10. In this configuration, the conductor access slots 52 and 54 are formed in the lower flange portion 20 of the grid element 10. More specifically, access slots 52 and 54 are formed in the upper surface 21 of the lower flange portion 20 on opposing sides of the vertical web portion 12. Conductor access slots 52 and 54 may either be longitudinally aligned or longitudinally offset from one another. Optionally, conductor access slots (not shown) can be formed in the bottom surface 23 of the lower flange portion 20, such that a conductor access slot is in transverse alignment with conductor access slot 52 and conductor access slot is in transverse alignment with conductor access slot 54.

In this configuration, the conductors 46, 48 are spaced horizontally and extend in parallel relation to one another in the longitudinal direction of the grid element, such that access slot 52 is in transverse alignment with conductor 46 and access slots 54 is in transverse alignment with conductor 48. In addition, the tap 60 is attached to the flange portion 20 of the grid element 10. It should be noted that a tap 60 which covers the flange portion 20, as well as, the vertical web portion 12 can also be used. In either case, each crimp connector 50 is positioned in housing 62 such that the crimp connector 50 is in transverse alignment with a respective conductor access slot 52, 54, and, thus, in turn with a respective conductor 46, 48.

Figure 4:
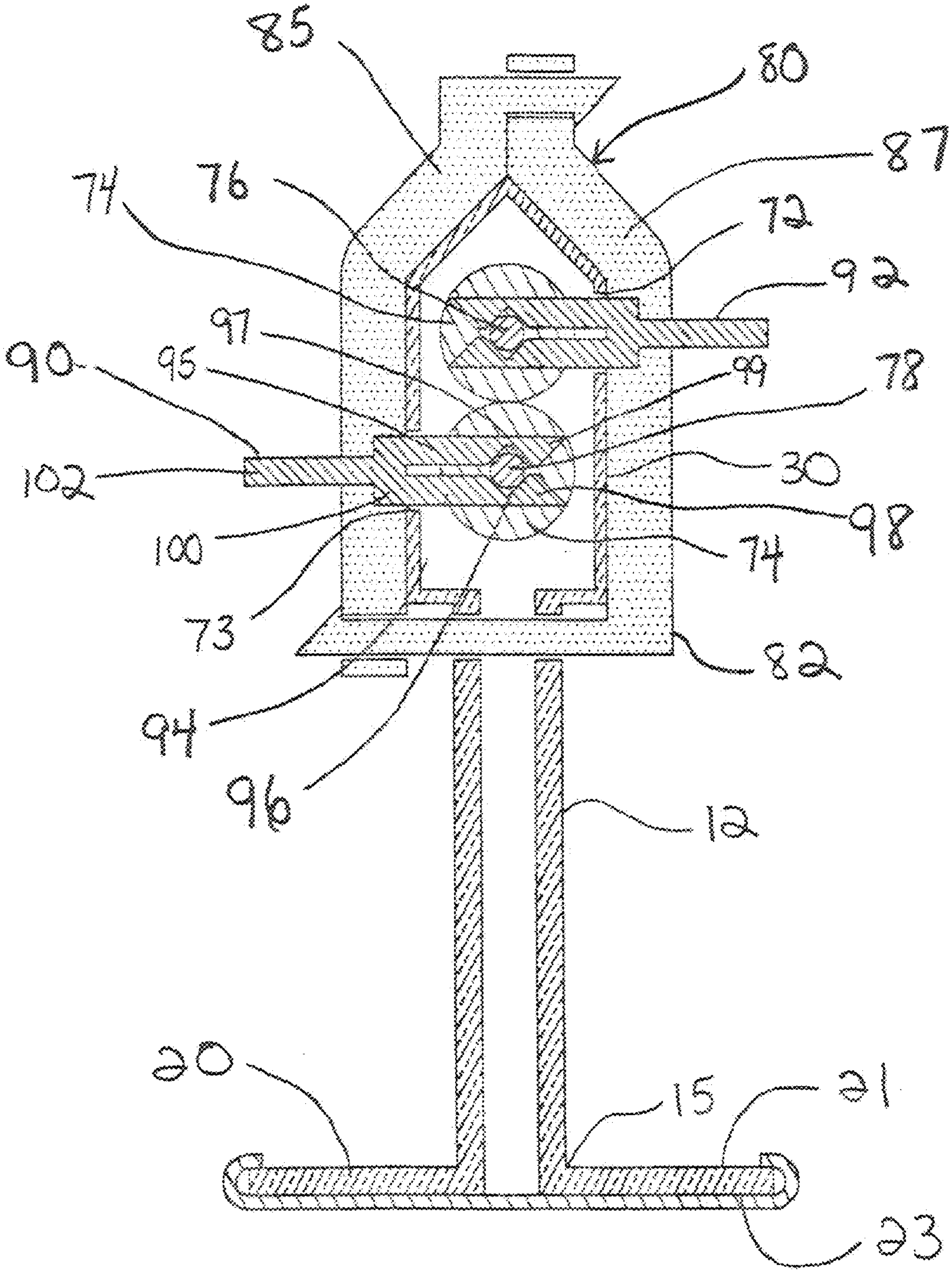
FIG. 4 is a cross-sectional view of an electrically powerable grid element in accordance with another exemplary embodiment of the invention.

A third example embodiment is shown in FIGS. 2 and 4. Embedded within the bulb portion 30 are first and second vertically spaced conductors, 76 and 78 respectively. Each of the vertically spaced conductors, 76, 78 is contained in an insulator 74. Formed in hollow bulb portion 30 of grid element 10 are first and second conductor access slots, 72 and 73 respectively. The first and second conductor access slots 72, 73 are formed in opposite sides of the bulb portion 30 and are transversely offset from one another. Thus, the first conductor access slot 72 is aligned with conductor 76 and the second access slot 73 is aligned with conductor 78.

Turning to FIG. 4, a tap 80 is attached to the bulb portion 30 of the grid element 10 and is shaped to closely conform to at least the bulb portion 30 of the grid element 10. The tap 80 includes a housing 82 which may be constructed of multiple components or a single piece. In the example embodiment shown in FIG. 4, the tap housing 82 includes a first half body 85 and a second half body 87. The housing 82 is formed from an insulating material such as plastic or rubber. Each half body 85, 87 is formed to cover at least one side of the bulb portion 30.

Partially embedded in each of the first and second half bodies 85, 87 are U-shaped contacts 90 and 92 respectively. Each contact 90, 92 has the same components and will be described herein with reference to contact 90. Contact 90 has a lower arm 94 having a notch 96 adapted to engage the lower surface of conductor 78 and a pointed end 98 for piercing insulator 74. Contact 90 also has an upper arm 95 having a notch 97 adapted to engage the upper surface of conductor 78 and a pointed end 99 for piercing insulator 74. The lower arm 94 and upper arm 95 of the contact 90 are joined by base 100. Base 100 is embedded in half body 85 and the lower and upper arms 94 and 95 extend through conductor access slot 73 in bulb portion 30. Connected to base 100 of contact 90 is connecting stud 102 which extends outwardly from the outer surface of the half body 85 and serves as a connecting device for electrical appliances and the like.

The description of the example embodiments of the present invention is given above for the understanding of the present invention. It will be understood that the invention is not limited to the particular embodiments described herein, but is capable of various modifications, rearrangements and substitutions which will now become apparent to those skilled in the art without departing from the scope of the invention.

For example, for illustrative purposes, T-bar grid elements are shown throughout the drawings, however, it should be noted that grid elements of various configurations may also be used, such as those sold by Armstrong World Industries, Inc. More particularly, the lower flange portion 20 of the grid element 10 may form a track 120, or bracket, as shown in FIGS. 5A and 5B. Similarly, a cap in the form of a track may be mounted on the lower flange portion 20 of a grid element 10. The entire track 120 length is available for insertion of functional devices from below the ceiling plane. The flat wire conductive strips 40 are housed in the track as shown in FIGS. 5A and 5B. In order to access the flat wire conductive strips 40 from above the plane of the grid framework, apertures 122 can be formed in track 120.

It is intended that the following claims cover all such modifications and changes as fall within the true spirit and scope of the invention.

What is claimed is:

1. An electrically powerable grid element comprising:

a vertical web portion extending along a longitudinal axis and having first and second opposing sides and a bottom edge, a flange portion extending from the bottom edge of the vertical web portion in a direction transverse to the longitudinal axis;

first and second conductive members having opposing polarity, the first and second conductive members being carried in the vertical web portion of the grid element;

a first electrical access slot which exposes a portion of the first conductive member on the first side of the vertical web portion;

a second electrical access slot which exposes a portion of the second conductive member on the second side of the vertical web portion, wherein the first and second electrical access slots are offset from one another in at least two axes; and a tap which is attached to the vertical web portion and forms an electrical connection with the first and second conductive members via the first and second electrical access slots, the tap having a housing which covers the first and second opposing sides of the vertical web portion and the flange portion.

2. The electrically powered grid element of claim 1, wherein the axes are selected from the group consisting of the longitudinal axis, a vertical axis and a transverse axis.

3. The electrically powered grid element of claim 2, wherein the first and second electrical access slots are offset from one another in the longitudinal axis and the vertical axis.

4. The electrically powered grid element of claim 2, wherein the first and second electrical access slots are offset from one another in the longitudinal axis and the transverse axis.

5. The electrically powered grid element of claim 1, wherein the first and second electrical access slots are aligned in the longitudinal axis.

6. The electrically powered grid, element of claim 1, wherein the first and second electrical access slots are aligned in the vertical axis.

7. The electrically powered grid element of claim 1, wherein the first and second electrical access slots are in transverse alignment.

8. The electrically powered grid element of claim 1, wherein the tap includes a conductive member engaging means, wherein the conductive member engaging, means forms the connection with first and second conductive members.

9. The electrically powered grid element of claim 8, wherein the conductor engaging means is a crimp connector.

10. The electrically powered grid element of claim 8, wherein the conductor engaging means is transversely aligned with the first and second electrical access slots.

11. The electrically powered grid element of claim 1, wherein each of the first and second conductive members are flat wire conductive strips.

12. The electrically powered grid element of claim 1, wherein the combination of the first and second conductive members and the tap provide electricity to electrically powered devices.

13. The electrically powered grid element of claim 1, wherein the vertical web portion and the flange portion collectively form a beam having a substantially T-shaped transverse cross-section.

14. The electrically powered grid element of claim 1 wherein the flange portion is centered along the bottom edge of the vertical web portion so that a first portion of the flange portion extends transversely from the first side of the vertical web portion and a second portion of the flange portion extends transversely from the second side of the vertical web portion.

15. The electrically powered grid element of claim 1 wherein the flange portion is non-coplanar with the vertical web portion.

16. The electrically powered grid element of claim 1 wherein the flange portion is integral with the vertical web portion.

17. The electrically powered grid element of claim 1 wherein the vertical web portion has a length measured along the longitudinal axis, and wherein the flange portion extends from the bottom edge of the vertical web portion along an entirety of the length of the vertical web portion.

18. The electrically powered grid element of claim 1 further comprising a connecting stud partially embedded within the housing of the tap, the connecting, stud extending outwardly from an outer surface of the housing of the tap for connecting to electrically powered devices.

19. The electrically powered grid element of claim 18 wherein the connecting stud extends outwardly from a portion of the housing of the tap that covers a bottom surface of the flange portion.

20. The electrically powered grid element of claim 1 further comprising a hollow bulb portion extending integrally from the vertical web portion at is top edge of the vertical web portion.

* * * * *